United States Patent
Riefel

(10) Patent No.: US 9,589,244 B2
(45) Date of Patent: Mar. 7, 2017

(54) REQUEST PROCESS OPTIMIZATION AND MANAGEMENT

(71) Applicant: Maximus, Inc., Austin, TX (US)

(72) Inventor: Randall Riefel, Austin, TX (US)

(73) Assignee: Maximus, Inc., Austin, TX (US)

( * ) Notice: Subject to any disclaimer, the term of this patent is extended or adjusted under 35 U.S.C. 154(b) by 0 days.

(21) Appl. No.: 14/502,828

(22) Filed: Sep. 30, 2014

(65) Prior Publication Data

US 2015/0092936 A1   Apr. 2, 2015

Related U.S. Application Data

(60) Provisional application No. 61/884,906, filed on Sep. 30, 2013.

(51) Int. Cl.
| | |
|---|---|
| H04M 3/00 | (2006.01) |
| G06Q 10/06 | (2012.01) |
| G06Q 40/04 | (2012.01) |
| H04M 3/51 | (2006.01) |
| H04M 3/523 | (2006.01) |

(52) U.S. Cl.
CPC ... *G06Q 10/063118* (2013.01); *G06Q 10/067* (2013.01); *G06Q 10/0637* (2013.01); *G06Q 40/04* (2013.01); *H04M 3/5175* (2013.01); *H04M 3/523* (2013.01); *H04M 2203/402* (2013.01)

(58) Field of Classification Search
CPC ............ G06Q 10/063; G06Q 10/0631; H04M 2203/402
USPC ....... 379/265.01–265.14, 266.01–266.1, 309
See application file for complete search history.

(56) References Cited

U.S. PATENT DOCUMENTS

| | | | |
|---|---|---|---|
| 6,711,253 B1 | 3/2004 | Prabhaker | |
| 7,103,562 B2 * | 9/2006 | Kosiba | G06Q 10/04 379/265.06 |
| 7,937,333 B2 | 5/2011 | Ryan, Jr. et al. | |
| 8,300,797 B1 | 10/2012 | Benesh et al. | |
| 8,401,886 B2 | 3/2013 | Khetarpal et al. | |
| 8,488,769 B1 | 7/2013 | Noble, Jr. et al. | |
| 8,539,493 B1 | 9/2013 | Robertson et al. | |
| 8,645,175 B1 | 2/2014 | Arbogast | |

(Continued)

OTHER PUBLICATIONS

International Preliminary Report on Patentability, Application No. PCT/US14/58425, mailed Sep. 24, 2015, 12 pages.

(Continued)

*Primary Examiner* — William Deane, Jr.
(74) *Attorney, Agent, or Firm* — Meyertons, Hood, Kivlin, Kowert & Goetzel, P.C.; Eric B. Meyertons

(57) ABSTRACT

A method of optimizing and managing processes for responding to requests (such as claims for benefits, or insurance applications) includes creating a process definition, performing an optimization of a resource employed for the process, and developing recommendations for process design or execution based on the simulation and optimization. In some cases, the resource being optimized is staffing. In some cases, the requests relate to acquisition of health insurance or governmental program services (for example, health insurance exchanges, benefit eligibility, Medicaid enrollment). The optimization may be non-deterministic and consider uncertainty factors. In some cases, a staffing level is estimated based on the optimization.

20 Claims, 8 Drawing Sheets

(56) References Cited

U.S. PATENT DOCUMENTS

| | | |
|---|---|---|
| 8,811,597 B1 | 8/2014 | Hackbarth et al. |
| 8,938,063 B1 | 1/2015 | Hackbarth et al. |
| 2005/0065837 A1* | 3/2005 | Kosiba .................. G06Q 10/04 705/7.13 |
| 2005/0129212 A1 | 6/2005 | Parker |
| 2005/0135600 A1 | 6/2005 | Whitman, Jr. |
| 2005/0135601 A1 | 6/2005 | Whitman, Jr. |
| 2006/0129617 A1 | 6/2006 | Nagai et al. |
| 2007/0198322 A1* | 8/2007 | Bourne .................. G06Q 10/06 705/7.13 |
| 2007/0226340 A1 | 9/2007 | Hastings et al. |
| 2008/0172286 A1* | 7/2008 | Ramanujan ............ G06Q 10/06 705/7.31 |
| 2011/0161933 A1 | 6/2011 | Hudson |
| 2012/0014519 A1* | 1/2012 | Kosiba .................. G06Q 10/04 379/265.08 |
| 2012/0051536 A1 | 3/2012 | Chishti et al. |
| 2012/0087486 A1* | 4/2012 | Guerrero ............. H04M 3/5175 379/265.02 |
| 2013/0132583 A1* | 5/2013 | McCord .................. H04L 12/66 709/226 |
| 2014/0211932 A1 | 7/2014 | Zhao et al. |
| 2014/0211933 A1 | 7/2014 | Vymenets et al. |
| 2014/0219436 A1* | 8/2014 | Kosiba .................. G06Q 10/04 379/265.02 |
| 2014/0362984 A1 | 12/2014 | Danson et al. |

OTHER PUBLICATIONS

International Search Report and Written Opinion, Application No. PCT/US14/58425, mailed Feb. 24, 2015, 19 pages.
International Preliminary Report on Patentability, Application No. PCT/US14/58431, mailed Feb. 16, 2016, 5 pages.
International Search Report and Written Opinion, Application No. PCT/US14/58431, mailed Aug. 27, 2015, 11 pages.
International Preliminary Report on Patentability, Application No. PCT/US14/58432, mailed Nov. 12, 2015, 7 pages.
International Search Report and Written Opinion, Application No. PCT/US14/58432, mailed Jun. 18, 2015, 7 pages.
Non-Final Office Action, U.S. Appl. No. 14/502,807, mailed Mar. 25, 2015, 13 pages.
Final Office Action, U.S. Appl. No. 14/502,807, mailed Oct. 30, 2015, 18 pages.

* cited by examiner

REQUEST PROCESS OPTIMIZATION AND MANAGEMENT

PRIORITY CLAIM

This application claims priority to U.S. Provisional Application Ser. No. 61/884,906 entitled "REQUEST PROCESS OPTIMIZATION AND MANAGEMENT" filed Sep. 30, 2013, which is incorporated herein by reference in its entirety.

BACKGROUND

Field

The present invention relates to the field of client services. More particularly, the present invention relates to assessing and managing requests for clients.

Description of the Related Art

Consumers, businesses, and other persons who receive products and services from business and government entities often rely on interaction with customer service representatives to carry out transactions or to resolve problems with a product or service. Companies and agencies may that provide such services may need to handle large numbers of client contacts on a daily basis. In many cases, a company or agency sets up a contact center (such as a call center) with a group of agents (for example, customer service representatives) to handle the client contacts. A contact center at one facility may serve all of the clients for a particular state or region, or even worldwide.

Due to the variety and complexity of matters being handled in the contacts, issues handled by a contact center may not be resolved in an efficient manner. For example, in any given case, the actions of one agent may be carried out in a manner that is duplicative or in conflict with those of another agent. In addition, some cases may not be resolved in a timely manner due to agent inefficiencies (for example, performing unnecessary actions) or miscommunication between a customer and an agent, or between agents.

In some cases, responding to a request for a particular service, product, or benefit is a complex process that takes time and involves many steps and interactions (such as, for example, applying for a government benefit.) The amount of resources (including computing, network, and/or staff) needed to handle the load may be difficult to predict and plan for. Moreover, defects may occur in processing that prevent successful fulfillment of a request. For example, a request may become stalled or be lost from a processing queue. In addition, in cases where a large number of processes is carried out by multiple computer systems, over multiple channels of communication (for example, voice, web chat, and text), identifying and correcting defects, redundancies, stuck conditions, and inefficiencies in computer-implemented processes may be difficult or impossible to do in a timely manner.

SUMMARY

Systems and methods for assessing and managing requests for clients are disclosed. In an embodiment, a method of managing processes for responding to requests includes creating a process definition; performing, by a contact center management system implemented on one or more computer systems, using the process definition, an optimization of one or more resources employed for the process is performed by a contact center management system implemented on one or more computer systems. One or more recommendations are developed based on the optimization.

In an embodiment, a system includes one or more computer systems configured to implement a contact center management system. The contact center management system is configured to create a process definition; perform, using the process definition, an optimization of one or more resources employed for the process; and develop one or more recommendations based on the optimization.

In an embodiment, a non-transitory, computer-readable storage medium comprising program instructions stored thereon that, when executed on one or more computers, cause the one or more computers to implement a contact center management system configured to: create a process definition; perform, using the process definition, an optimization of one or more resources employed for the process; and develop one or more recommendations based on the optimization.

In an embodiment, a method of managing processes for responding to contact arrivals includes monitoring, by a contact center management system implemented on one or more computer systems, actual contact arrivals. Actual contact arrivals are compared with one or more arrival forecasts. At least one staffing level is determined based at least in part on the comparison.

In an embodiment, a system includes one or more computer systems configured to implement a contact center management system. The contact center management system the contact center management system is configured to: monitor actual contact arrivals; compare, by the computer system, actual contact arrivals with one or more arrival forecasts; and determine at least one staffing level based at least in part on the comparison.

In an embodiment, a non-transitory, computer-readable storage medium comprising program instructions stored thereon that, when executed on one or more computers, cause the one or more computers to implement a contact management system configured to: monitor actual contact arrivals; compare actual contact arrivals with one or more arrival forecasts; and determine at least one staffing level based at least in part on the comparison.

Figure 1:
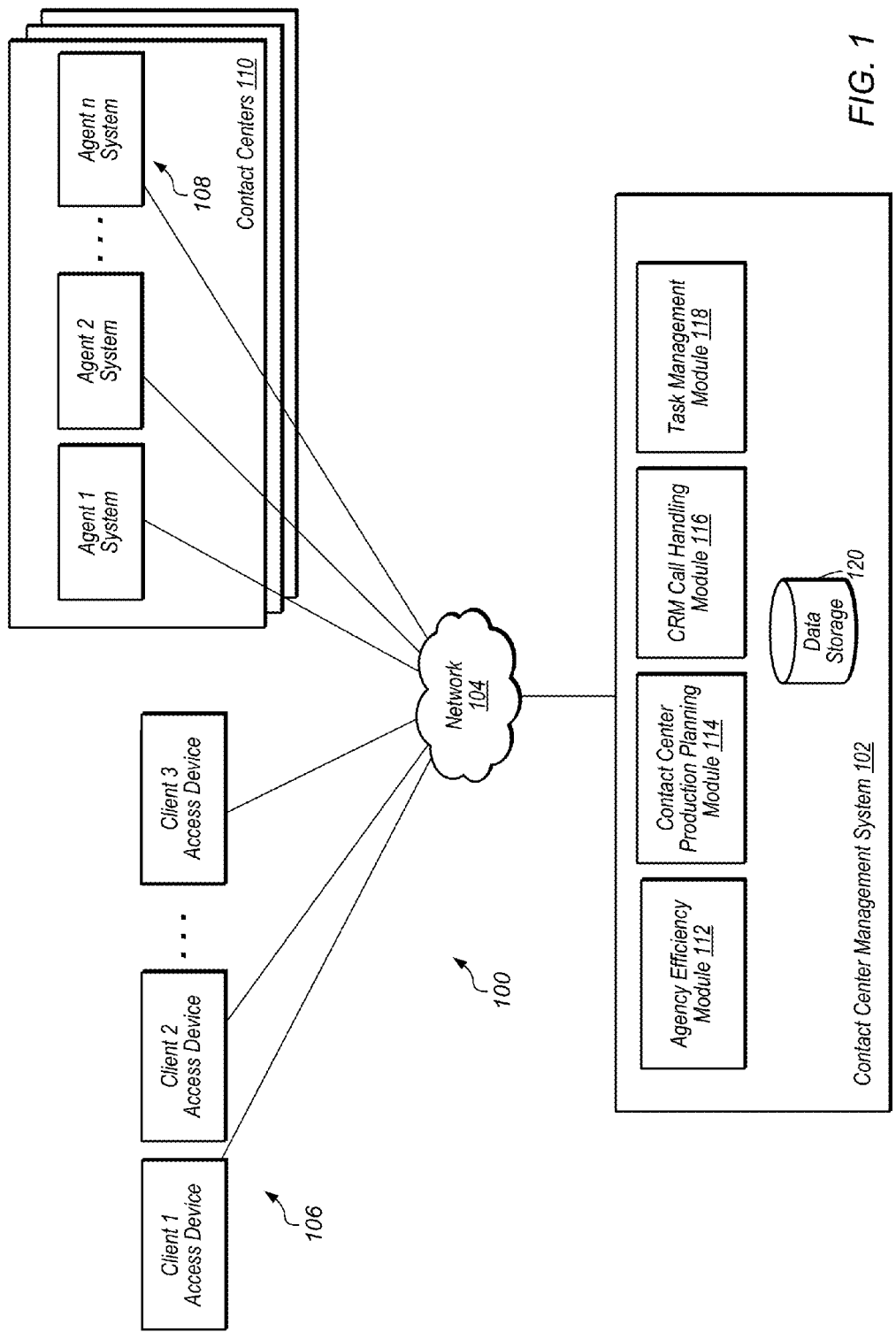
FIG. 1 illustrates one embodiment of a contact center system for providing services to clients.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF ILLUSTRATIVE EMBODIMENTS

In some embodiments, a method of optimizing and managing processes for responding to requests (such as claims for benefits, or insurance applications) includes creating a process definition, performing an optimization of a resource employed for the process, and developing recommendations for process design or execution based on the simulation and optimization. In some cases, the resource being optimized is staffing. In some cases, the requests relate to acquisition of health insurance or governmental program services (for example, health insurance exchanges, benefit eligibility, Medicaid enrollment). The optimization may be non-deterministic and consider uncertainty factors. In some cases, a staffing level is estimated based on the optimization.

In some cases, the optimization/estimates are used/refreshed in a production environment (for example, during execution of responses to the requests). In some cases, the system makes an initial feasibility determination of a process based on a set of factors (for example, new workload forecast, employee absences, and existing workload). If the initial feasibility determination is negative, the system can recommend and/or implement changes to overcome the deficiency. A manager may interact with the system by way of a dashboard.

As used herein, "client" means, in the context of a provider of products or services, a person who has received products or services, who is receiving products or services, or is seeking to acquire products or services. "Client" includes a person seeking or receiving a benefit (for example, a government benefit such as a tax credit, access to a potential employer, or insurance coverage) or assistance.

As used herein, "contact" refers to a contact by client or other person. Examples of modes of contacts include inbound calls and web chat inquiries. Contacts may originate from any person or group, including customers, subscribers, purchasers, enrollees, potential enrollees, general citizens, providers, health plans, or others, including anonymous callers. "Contacts" also includes program information or health plan enrollment activities.

In some embodiments, actions carried out by a person or group of persons (for example, agents at a contact center) or processes performed on a computing system are part of an enrollment or application process for an individual or group of individuals to receive a benefit. For example, an individual seeking to enroll in a plan may, by way of a computer network, submit an application for enrollment in an insurance plan, request information about a plan, or make requests for information about a plan, submit information to support an application, or receive notifications relating to the plan. Agents or other service personnel perform actions relating to a benefit, such as handling contacts relating to enrollment requests, determining eligibility, and managing complaints and appeals.

FIG. 1 illustrates one embodiment of system for providing services to clients from a contact center. System 100 includes contact center management system 102, network 104, client access devices 106, and contact center agent systems 108 at contact centers 110. Clients may communicate with agents at contact center 110. Client access devices 106 may include telephone, mobile phones, personal computer systems, or other electronic device. In some embodiments, client access devices 106 communicate with agents at a contact center via multiple networks. For example, clients using system 100 may variously make contact with the agents by way of the internet, publicly switched telephone network ("PSTN"), and wireless telephone networks.

Contact center management system 102 includes agency efficiency module 112, contact center production planning module 114, CRM call handling module 116, task management module 118, and data storage 120. In some embodiments, contact center management system 102 is located at the same facility as one or more of contact centers 110.

In some embodiments, production planning includes tracking forecasted arrivals against actual arrivals, optimizing staffing needs, and managing service levels. In various embodiments, a system performs operations to determine one or more of the following:

How many contacts have been received, what does the call pattern look like at hourly, daily and weekly level?

How frequently has the forecast been adjusted? How does the original forecast compare to the actual contacts received?

Is there a meaningful variance against the forecast; and if so, is the variance observed for a specific queue or common to all queues?

Is the contact center properly staffed? Based on volume and staff availability, which day is "critical day" and needs to be monitored and managed closely?

How do calls flow through the IVR menu? How many calls are contained at each IVR path?

Are contact center operations being successively managing to targets? How big is the risk based on the performance in the past few days?

Assuming a few "bad days", can KPRs for this planning horizon be met? What would be the minimum performance target that must be achieved for the next few days?

Why is the service level lower than expected for a particular day?

In an embodiment, a contact center production planning module implements the following functionalities:
a. Actual Arrivals Monitoring and Service Level Conformance,
b. Arrivals Monitoring (both Actual and Forecasts) and Service Level Conformance, and
c. Staff Planning.

In some embodiments, these functionalities are implemented through sub-modules.

Functionalities may be implemented independently to suit specific project needs. For example, an Arrival Monitoring and Service Level Conformance sub-module may track contact actuals and performance at pre-determined intervals (for example, 30 minute intervals), which may be rolled up to longer intervals (for example, an hourly, daily and weekly level); an Arrivals Monitoring (includes both Actuals and Forecasts) and Service Level Conformance, may provide forecasted volumes and performance metrics that management can use as guidance for day-to-day planning. The sub modules, when implemented together, may provide a complete picture on the actual performance as compared with the forecasts in a specified production plan.

In an embodiment, a Contact Center Production Planning system receives contact data by interval from the Automatic Call Distributor (ACD) and Interactive Voice Response (IVR). The system may also receive data from the Work Force Management (WFM) application. This system can read data from a properly formatted external source, e.g., staffing optimization models. The staffing optimization module may provide pre-established targets on key production planning metrics.

A Contact Center Production Planning module management may be used to monitor performance, anticipate call demand, establish realistic ongoing service targets based on past performance, and provide insight into areas for continuous process improvement.

The system may enable communication on call volumes, performance, handle times, and staffing levels with client and among the interval parties. In some embodiments, a system is used to provide near real time visibility with the ability to make better decisions faster: gains time for management to react quickly to unexpected events, such as call volume surges, system issues, and unplanned staff leave, by re-arranging resources and planning over time if necessary.

In some embodiments, a system monitors how many customers begin self-service via IVR including containment rates compared to overall call volume.

In some embodiments, a system automates subscriptions and alerts for information when needed or at scheduled intervals.

The system may support ad-hoc analysis and anomaly diagnosis around contact arrival, IVR, and service performance. In some embodiments, a system automatically stores historical forecasts and enables assessment of the quality of the initial forecast and how frequently the forecast was adjusted. Forecast accuracy can be illustrated.

In some embodiments, a system performs computations and generates graphical or tabular information about operations or processes, such as system performance, agent performance, agent efficiency, task management, workflow management, or defect detection. Information from computations performed by the system may be presented to users in the form of dashboards, reports, and alerts. In some embodiments, the system performs computations to perform an optimization, a simulation, or both.

In various embodiments, a contact center planning system provides users with displays including dashboards, reports and analytics. Examples of dashboards, reports and analytics that may be included in a system are described below. The data provided to the users may serve as the basis for many mandatory state reports and best practice data visualizations. In one embodiment, an interval for a contact center planning module is set at 30 minutes.

As illustrated in FIG. 1, contact center management system 102 may include and may be implemented as multiple functional modules or components, with each module or component including one or more provider network resources (e.g., computing resources, storage resources, database resources, etc.). Contact center management system 102 may include more or fewer components or modules, and a given module or component may be subdivided into two or more sub-modules or subcomponents. Also, two or more of the modules or components as shown can be combined.

Arrival Monitoring and Service Level Conformance
Contact Center Actual Arrivals and Performance Dashboard This dashboard provides visibility into contact actual arrival volumes and near real time service performance to ensure the contact center is behaving as expected.

When deployed together with second sub module, actuals and forecasts may be deployed in one dashboard: the Arrivals and Performance Overview Dashboard. It triggers alerts and helps Contact Center Management react quickly to unexpected surges in volumes, meaningful deviations from the expected forecast or unplanned staff leave.

Data Metrics:
1) Contact Arrivals (Tab 1)
   Actual contacts created
   Actual contacts offered
   Actual contacts handled
   Actual contacts transferred
   Displayed as line charts (x-axis is each day of the month) in separate charts.
2) Service Performance (Tab 2)
   Actual Average speed to answer (ASA)
   Abandonment rate (AB Rate)
   Actual average handle time (AHT)
   Actual service level (% answered within SLA)
   Actual % calls result in a transfer
   Displayed in a table matrix with the value of the metric for the interval chosen and the graph with 6-day rolling trend.
   For metrics such as actual ASA and AHT, control charts may be displayed to include thresholds with green, yellow and red where outliers can be easily identified.
   For those metrics with two tiers (ASA-80% in X seconds, and 100% in Y seconds), user can select tier from a drop-down adjacent to the table/control chart. For instance, tier 1 is 80% of calls in 120 seconds. Please see mockups.

Filters:
   Select desired date range, including past months. Default is month-to-date.
   Select the filter items from drop-downs for contact type (inbound call, webchat, etc), queues, queue, language, or program. Aggregate date is available in all drop-downs by selecting "All".

Capabilities, Alerts and Modifications:
   Users can analyze trends for the specified time period.
   Alerts and email notifications "push" actionable information to users when thresholds exceed or are below set boundaries (min/max) for incoming contact volumes. This is most beneficial when used in conjunction with production planning forecasts when meaningful deviations between actual and forecasts are escalated to management.
   In addition, real-time monitoring of the AHT by queue can help detect outliers and alert management before other metrics such as ASA get affected. Contact Center management can realign resources with the appropriate capabilities as needed.

Contact Center Actual Arrivals and Performance Intraday Dashboard

This dashboard may track intraday metrics for contact actual arrivals and service performance to assess if any immediate actions need to meet the goal of the current or next day. This is parallel with Actual Arrivals and Performance Dashboard except that the x-axis is interval instead of day. Same filters are applicable here.

Users can select the day they want to see (default is current day).

Contact Center

IVR Usage Dashboard

This dashboard provides high level IVR information, such as containment and drills into task data related to IVR paths to help highlight problem areas and opportunities for improvement for management.

Data Metrics:
1) Global View (Tab1)
   Contacts created
   Contacts offered to ACD
   Contacts contained in IVR
   IVR containment rate
   % contacts contained at each of the top five IVR paths
   Average time spent in IVR Metrics above are all actuals. IVR containment rate is displayed in histogram; the rest are displayed in line chart by contact type.

2) Self Service Path View (Tab 2)
   For each self service path code:
   Contacts entering
   Contacts transferred
   Contacts completed
   Minutes in IVR transferred
   Minutes in IVR completed
   Metrics above are all actuals. Displayed as line charts.

Filters:
   Select interval desired, including past months up to 12 months. Default is month-to-date.

Capabilities, Alerts and Modifications:
   In some embodiments, users analyze trends for a specified time period (for example, a week, a month, or a quarter).

Reports

Contact Center Actual Arrivals and Performance Monthly Report

This report serves as service level deliverable for each month. Managers may also use this report internally for middle-of-month performance review. Historical data will be used for determining call trend and analyze handle time, etc.

Data Metrics:
   For each contact type (i.e., inbound calls and web chat):
   Contacts created
   IVR containment rate
   Contacts offered
   Contacts abandoned
   Contacts handled
   Contacts Transferred
   % answered in service level AHT
   AB rate
   ASA
   AHT
   % calls result in a transfer
   Available headcount
   Longest wait time in queue
   Metrics above are all actuals.
   Displayed as grid. Each row of the report represents a day, with the option of displaying weekly and monthly subtotals.

Filters:
   Select desired date range, including past months. Default is month-to-date.
   Select the filter items from drop-downs for contact type (inbound call, webchat, etc), queues, queue, language, or program. Aggregate date is available in all drop-downs by selecting "All".

Contact Center Actual Arrivals and Performance Intraday Report

This report supports management to assess the need for staff adjustments and/or overtime planning. Historical interval data are used to assess the intra-day call pattern.

In addition, the WFM Analyst may use past interval performance to make improvements on staff schedules. This is parallel with Actual Arrivals and Performance Monthly Report, except that the rows represent intervals.

Users can select the day they want to see (default is current day).

Rivals Monitoring (Both Actual and Forecasts) and Service Level Conformance

Contact Center Arrivals and Performance Overview Dashboard

This includes actual, forecasts, and forecast-to-actuals deviations. This dashboard delivers the "pulse" of the contact center operation: current demand in relation to predicted demand, and prominent performance measures together with alerts/early warnings support business leader assessments of operational visibility.

Like the Actual Arrivals and Performance Dashboard, the Contact Center Arrivals and Performance Overview Dashboard provides visibility into contact arrival volumes and near real time service performance to ensure the contact center is behaving as expected.

In addition to information in the Arrivals Dashboard, this complete version offers forecast versus actual variance and detects issues or early signals on assumption changes (e.g. call pattern switch, AHT).

Alerts may be automatically triggered and help Contact Center Management react quickly to unexpected surges in volumes, meaningful deviations from the expected forecast or unplanned staff leave.

Data Metrics:
1) Contact Arrivals (Tab 1)
   Actual and forecast contacts created
   Actual and forecast contacts offered
   Actual and forecast contacts handled
   Actual and forecast contacts transferred
   Displayed as line charts (x-axis is each day of the month) by contact. Actuals and forecasts must overlay in the same chart.

Figure 2:
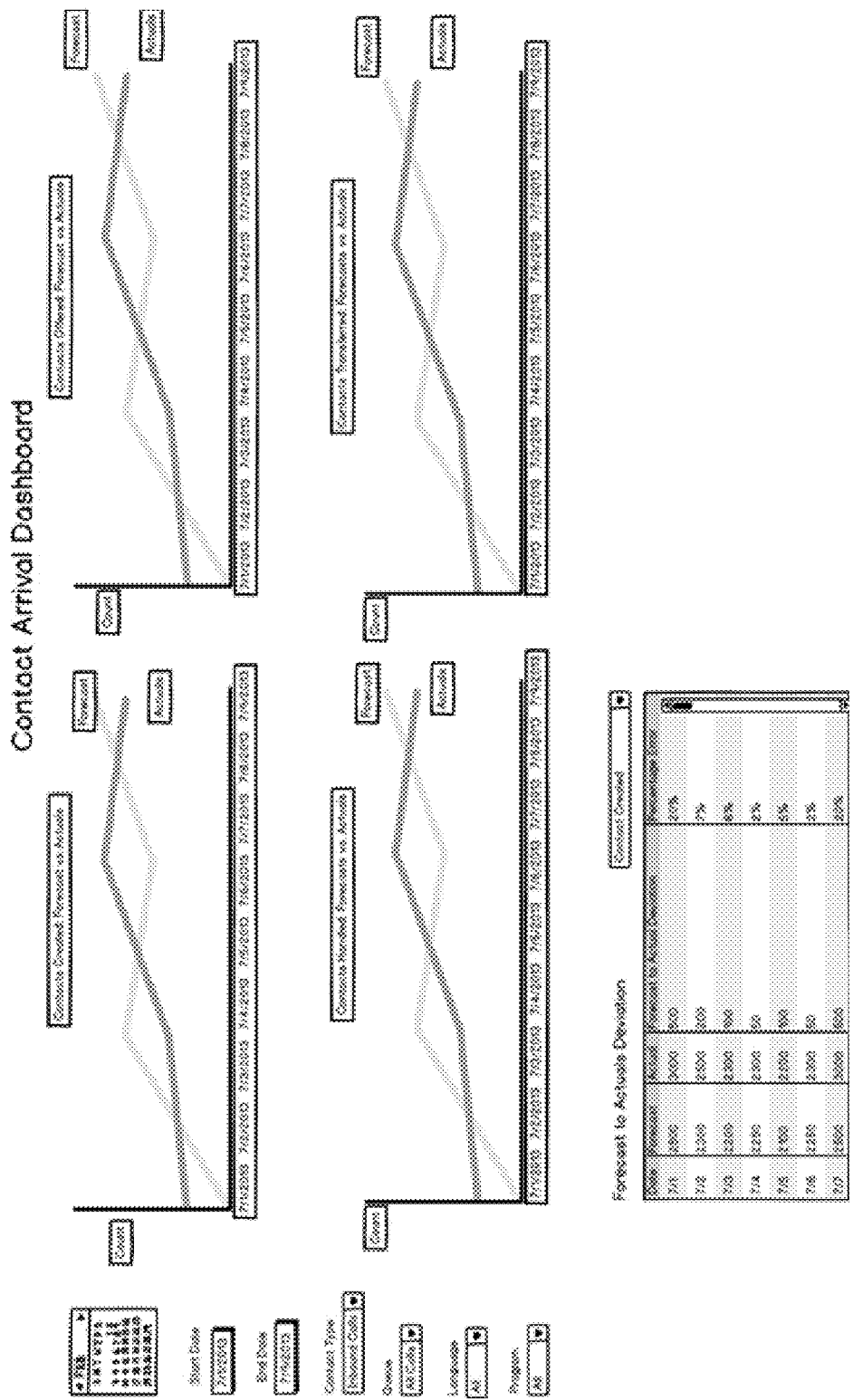
FIG. 2 illustrates one embodiment of a display including a contact arrivals tab for a contact center arrivals and performance dashboard.

FIG. 2 illustrates one embodiment of a display including a contact arrivals tab for a contact center arrivals and performance dashboard.

In a table matrix, display, for each of the above metrics, actual, forecast, and percentage error.

Figure 3:
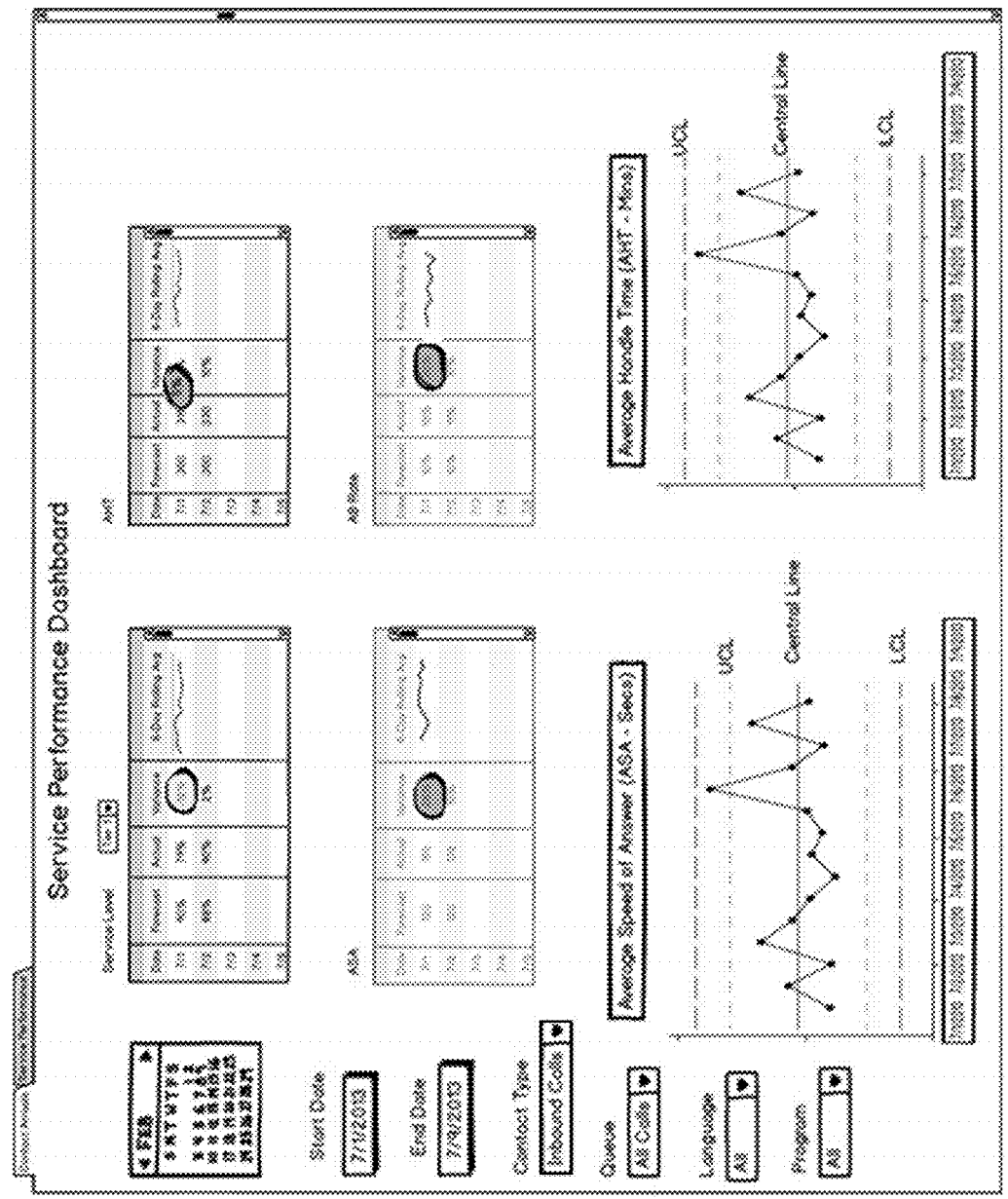
FIG. 3 illustrates one embodiment of a display including a service performance tab for a contact center arrivals and performance dashboard.

2) Service Performance (Tab 2)
   Actual and forecast average speed to answer (ASA)
   Actual and forecast % Answered/Abandonment rate (AB Rate)
   Actual and target average handle time (AHT)
   Actual and forecast service level (% answered within SLA)
   Actual and forecast % calls result in a transfer FIG. 3 illustrates one embodiment of a display including a service performance tab for a contact center arrivals and performance dashboard.

Displayed in a table matrix for each metric in the list above with the value of the metric (actual, forecasts, percentage error) for the interval chosen and the graph with 6-day rolling trend.

For metrics such as actual ASA and AHT, control charts will be displayed to include thresholds with green, yellow and red where outliers can be easily identified.

For those metrics with two tiers (ASA-80% in X seconds, and 100% in Y seconds), user can select tier from a drop-down adjacent to the table/control chart.

Filters:
Select desired date range, including past months. Default is month-to-date.
Select the filter items from drop-downs for contact type (inbound call, webchat, etc), queues, queue, language, or program. Aggregate date is available in all drop-downs by selecting "All".

Capabilities, Alerts and Modifications:

In some embodiments, users analyze trends for a specified time period (for example, a week, a month, a quarter).

Alerts and email notifications "push" actionable information to users when thresholds exceed or are below set boundaries for incoming contact volumes. Meaningful deviations between actual and forecasts may be escalated to management. In some embodiments, users can define tolerance thresholds.

In addition, real-time monitoring of the AHT by queue detects outliers and alerts management before other metrics such as ASA are affected. In response to the alerts, a contact center management system may realign resources with the appropriate capabilities as needed.

Contact Center Arrivals and Performance Overview—Intraday Dashboard (This includes Forecast-to-Actuals Deviations)

This dashboard tracks intraday metrics for contact arrivals and service performance to assess if any immediate actions need to meet the goal of the current or next day. This is parallel with Arrivals and Performance Overview Dashboard except that the x-axis is interval instead of day. Same filters are applicable here.

In some embodiments, users can select the day they want to see.

Contact Center Forecast Accuracy Dashboard

This dashboard allows users to assess the quality of historical forecasts in predicting actuals, and to track the frequency for making forecast adjustments. This targets the effectiveness of making forecast adjustments.

Data Metrics:
Number of forecasts in each planning horizon
Initial forecast vs actual variance (forecast to actual deviation)
Final forecast vs actual volume variance
Relevant notes for updates to forecast: It is mandatory for users to enter notes when updating a forecast. All notes for the specific date range will be displayed here.
Service level
Overall status (as Excellent, Good, and Poor) categorizing each month based on forecast quality and performance
Excellent: forecast was adjusted less than a threshold and SLR was met.
Good: forecast was adjusted more frequently than a threshold and SLR was met
Poor: SLR was not met.
Historical forecasts are displayed in a table matrix with the row representing a month.

Filters:
Select date range desired, including past months. Default is year to date.
Select up to three forecast versions to compare forecast volumes and headcounts. These will be presented in a line graph.

Capabilities, Alerts and Modifications:
Users can analyze trends for the specified time period. Alerts can be set up to inform management of the frequency of adjustments to forecasts.

This may be used as a warning against overadjustment. In addition, management has visibility in event planning integration, which could drive the forecast adjustment.

Figure 4:
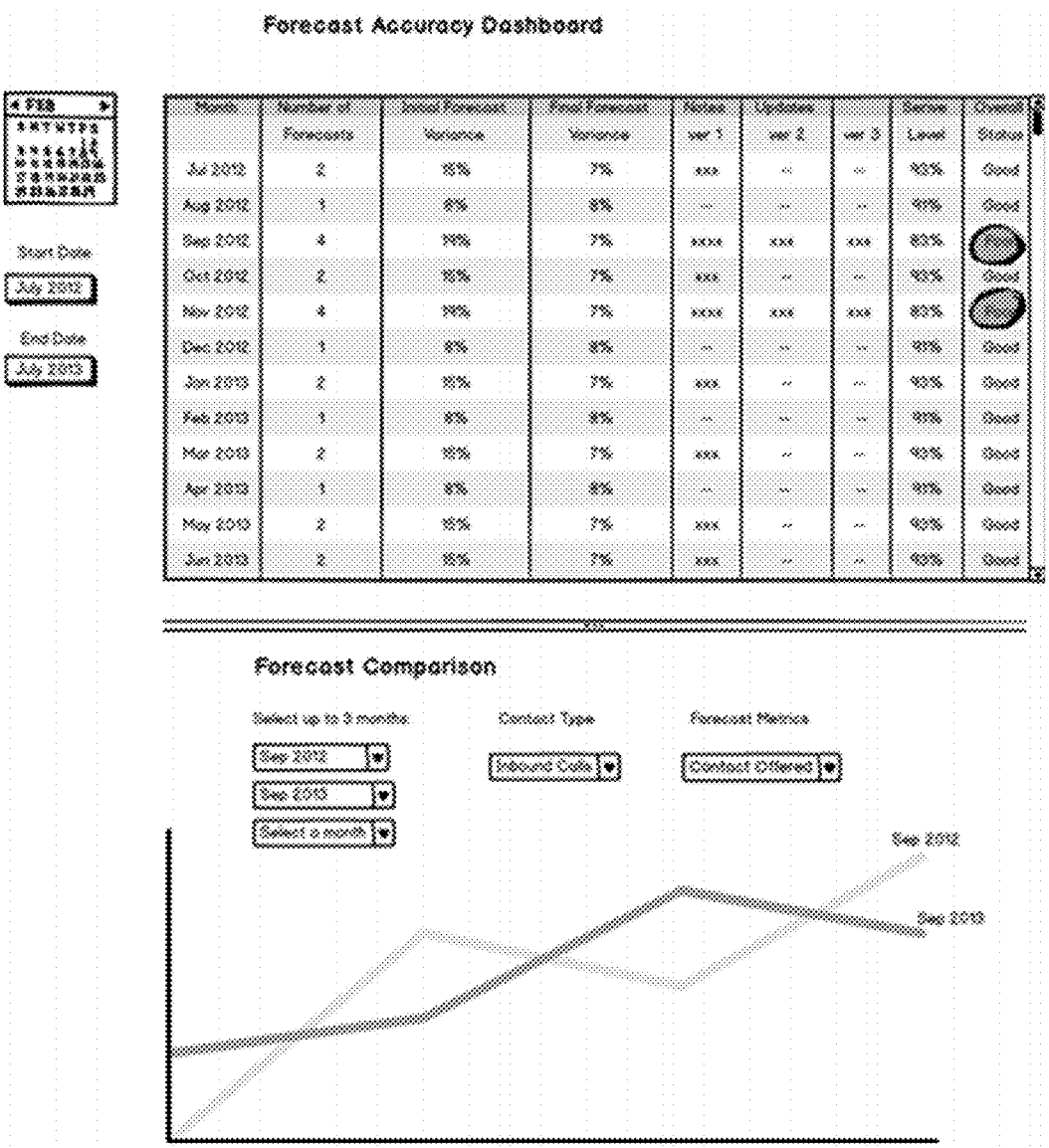
FIG. 4 illustrates one embodiment of a display including a forecast accuracy dashboard.

FIG. 4 illustrates one embodiment of a display including a forecast accuracy dashboard.

Reports

Contact Center Arrivals and Performance Monthly Report
(This includes Forecast-to-Actuals Deviations)

This report serves as service level deliverable for each month. Managers may also use this report internally for middle-of-month performance review. Historical data will be used for determining call trend and analyze handle time, etc.

In addition to information in the Actual Arrivals Report, this complete version offers forecast vs actual variance and detects issues or early signals on assumption changes (e.g. call pattern switch, AHT).

Data Metrics:
For each contact type (i.e., inbound calls and web chat):
Contacts created
IVR containment rate
Contacts offered
Contacts abandoned
Contacts handled
Contacts Transferred
% answered in service level AHT
AB rate
ASA
AHT
% calls result in a transfer
Available headcount
Longest wait time in queue Displayed as grid. Each row of the report represents a day, with the option of displaying weekly and monthly subtotals.

For each metrics, report actuals, forecast, and variance (value and percentage).

Filters:
Select desired date range, including past months. Default is month-to-date.
Select the filter items from drop-downs for contact type (inbound call, webchat, etc), queues, queue, language, or program. Aggregate date is available in all drop-downs by selecting "All".

Contact Center Arrivals and Performance Intraday Report
(This includes Forecast-to-Actuals Deviations)

This report can be leveraged on critical days to assess the need for staff adjustments and/or overtime planning.

In addition to the information in the Actual Arrivals Report, this complete report allows users to see how the production plan is executed on daily basis and to assess if pattern/target deviation needs to be addressed. This is parallel with Arrivals and Performance Monthly Report except the rows represent intervals.

Staff Planning

Contact Center Staffing Analysis Dashboard

This dashboard shows whether contact center is adequately staffed at daily or 30 minute interval level.

The dashboard may provide information to determine the following questions: What hour/which day is the most critical "managing point" and may significantly impact performance? Why the total available labor minutes seem adequate, however, contact center is still struggling to meet the KPR?

Contact Center management and analysts can assess the performance of the workforce scheduler via the difference between scheduled and requested headcounts. In addition, users can look into the variance between actual and scheduled headcounts.

In some embodiments, absenteeism is available in an Agent Performance Module.

Data Metrics:
1) Staffing at Daily Level (Tab 1)
   For each agent type
   Headcount
     Required available headcount
     Scheduled available headcount
     Actual available headcount
   Labor Minutes
     Required available labor minutes
     Scheduled available headcount
     Actual available headcount minutes
   For the above metrics, overlay actual and forecast may be displayed in one chart with actuals represented in histogram and forecast in line chart (x-axis is day of the month/interval of the day).
   In a table matrix, present the follow staffing and performance metrics:
   Headcounts variance
     Actual headcount−scheduled headcount
     Scheduled headcount−required headcount
     Corresponding Actual ASA
     Service Level ASA
     Corresponding Actual AB Rate
   Labor minutes variance
     Actual labor minutes−scheduled labor minutes
     Scheduled headcount−required labor minutes
     Corresponding Actual ASA
     Service Level ASA
     Corresponding Actual AB Rate
2) Staffing for Intraday intervals (Tab 2)
   This is parallel to Tab 1.
   The Following metrics are available if deploying agent performance module:
   Absenteeism
   Staff Utilization
   Staff Occupancy
Filters:
   Select agent type and date range where the staff will be analyzed.
   For Tab 1, default is month-to-date. For Tab 2, default is current day.
Capabilities, Alerts and Modifications:
   Alerts may be generated for users for daily and hourly metrics to highlight in red those days/intervals where staff shortfall exceeds user defined threshold level.

Figure 5:
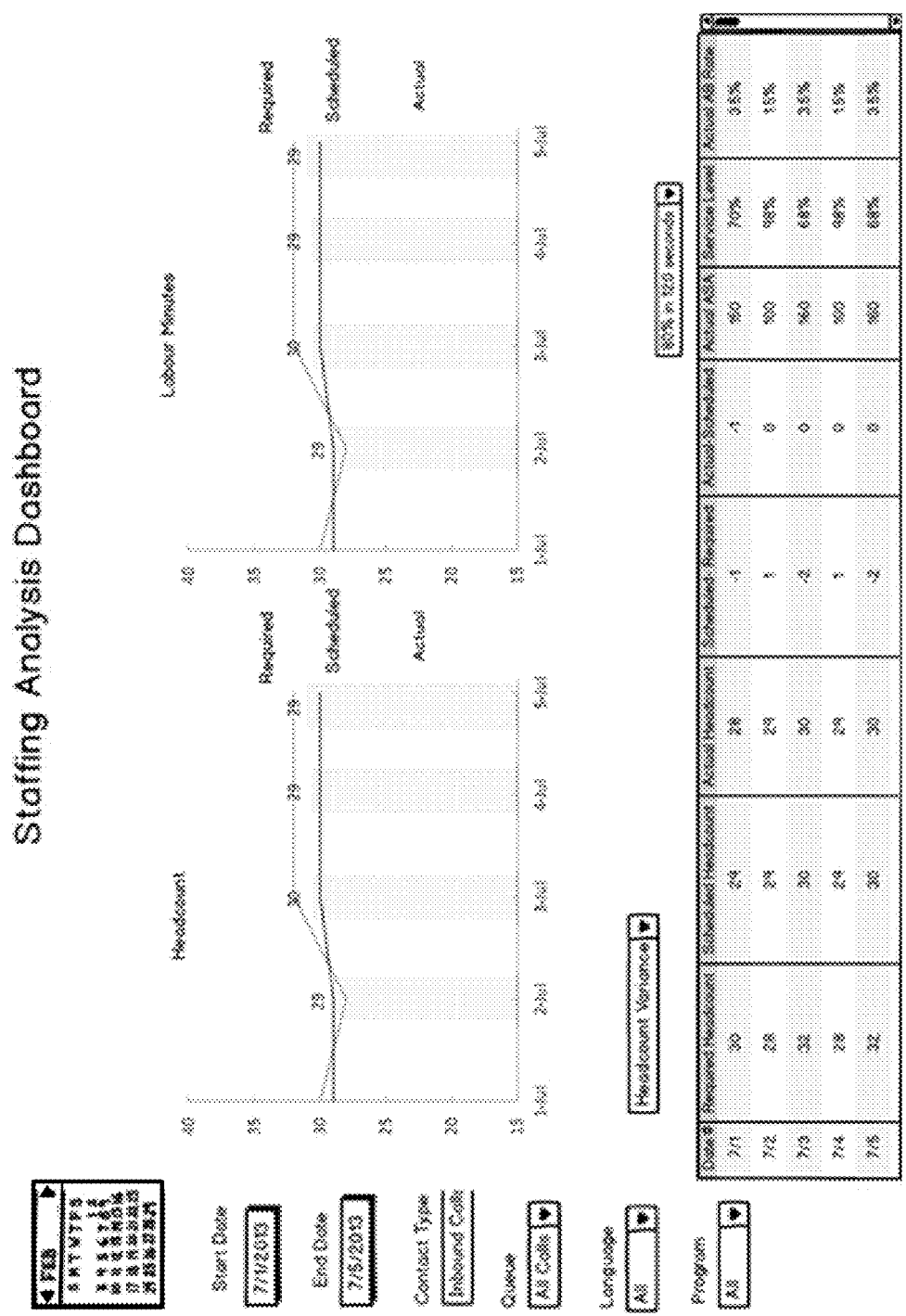
FIG. 5 illustrates one embodiment of a display including a staffing analysis dashboard.

FIG. 5 illustrates one embodiment of a display including a staffing analysis dashboard.

Contact Center Staff Planning and Execution Assessment Dashboard

This dashboard summarizes staffing performance over a longer horizon, e.g., six months or two years, and provides insights on a) how is call center managing on normal days when SLR should be met, b) how is call center managing during challenging conditions (high volumes, or staff shortfall), and c) how is call center managing during relatively slow periods (lower than forecasted volumes, or actual staff higher than required).

Data Metrics:
   Staff Plan Assessment at Monthly Level
     Number of months where SLR was met (or not met)
     Number of days where SLR was met (or not met)
     Number of days where staff and forecast variance are both within tolerance threshold and SLR was met (or not met)
   The above metrics are presented in pie chart.
     Number of days where staff variance (actual−required) is within threshold
     Number of days where staff shortfall (required−actual) exceeds threshold
     Number of days where staff excess (actual−required) exceeds threshold
   The above metrics are presented in horizontal bar chart.
     Number of days where forecast is within tolerance threshold, staff excess is more than threshold, and SLR was met (or not met)
     Number of days where forecast is within tolerance threshold, staff shortfall is more than threshold, and SLR was met (or not met)
     Number of days where forecast is below tolerance threshold, staff is within threshold, and SLR was met (or not met)
     Number of days where forecast is above tolerance threshold, staff is within threshold, and SLR was met (or not met)
   The above four metrics are displayed as doughnut chart.
   Thresholds are set for each metric; highlight in red those days where the value exceeds the threshold.
Filters:
   Select desired date range, including past months. Default is current quarter.
   Select the filter items from drop-downs for contact type (inbound call, webchat, etc) and metric (in this case: contact created, offered, handled). Aggregate date is available in all drop-downs by selecting "All".
Capabilities, Alerts and Modifications:
   In some embodiments, conditions (threshold around above data metrics) are defined for users based on which staff plan execution will be assessed. The dashboard may generate alerts for daily and hourly metrics and highlight in red the months where staff plan execution is poor, good, and excellent.

Figure 6:
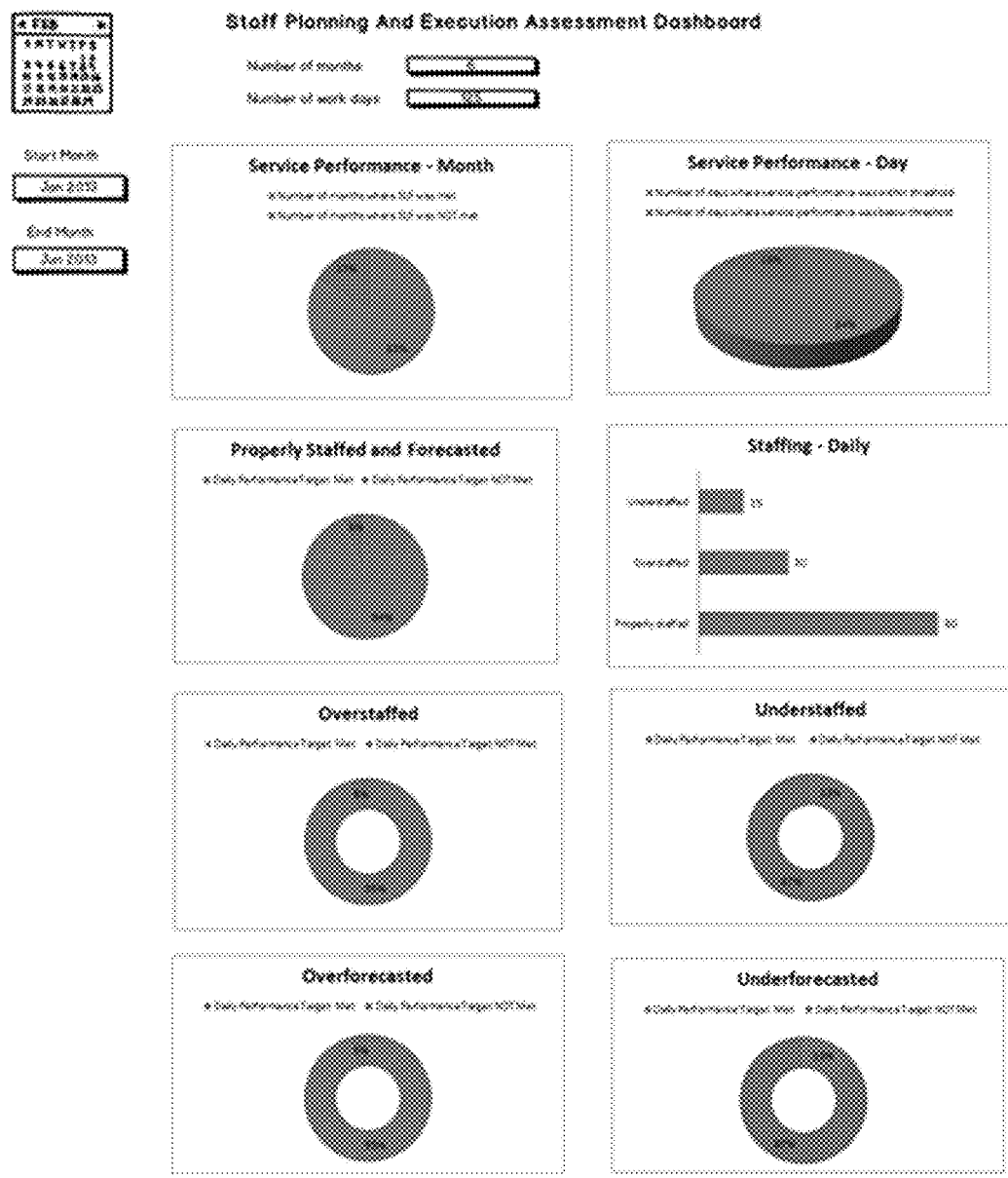
FIG. 6 illustrates one embodiment of a display including a staff planning and execution assessment dashboard.

FIG. 6 illustrates one embodiment of a display including a staff planning and execution assessment dashboard.

Reports

Staffing Analysis Monthly Report

This report allows management to check if the required staff level has been achieved consistently.

Data Metrics:
   Headcount
     Required available headcount
     Scheduled available headcount
     Actual available headcount
   Labor Minutes
     Required available labor minutes
     Scheduled available headcount
     Actual available headcount
   Service level
   ASA
   AB Rate
   In an embodiment, each row of the report represents a day. A grid may display weekly and monthly subtotals.
Filters:
   Select agent type and date range where the staff will be analyzed. Default is current month.

Staffing Analysis Intraday Report

This report provides data on how required staff level has been met at interval level.

This report may be run periodically to assess whether there are certain periods throughout the day when the call center has been consistently understaffed or overstaffed. This is parallel with Staffing Analysis Monthly Report except that the rows represent intervals. Users can select the day they want to see.

Figure 7:
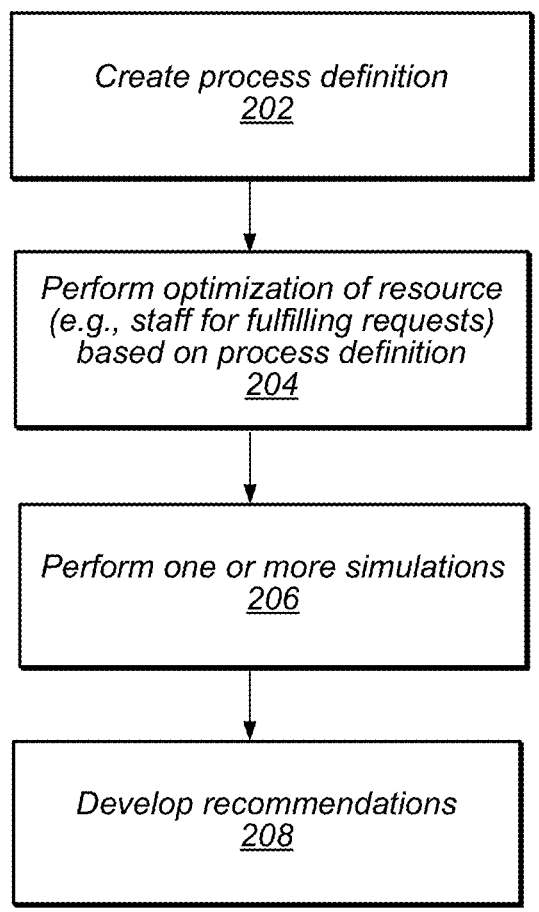
FIG. 7 illustrates one embodiment of a method of managing processes for responding to requests.

FIG. 7 illustrates one embodiment of a method of managing processes for responding to requests. At 202, a process definition is created. The process definition may relate to one or more resources. In some embodiments, the resource is staff for responding to requests.

At 204, an optimization of one or more resources employed for the process using the process definition. In certain embodiments, the optimization is non-deterministic. At 206, one or more simulations are performed.

At 206, one or more recommendations are developed based on the simulation and/or optimization.

In some embodiments, an initial feasibility determination of a process is made based on a set of factors. If the initial feasibility determination is negative, the system may recommend or implement changes to overcome deficiencies.

In some embodiments, services for managing and assessing operations at a contact center are provided by way of a cloud computing system over a communications network. FIG. 7 illustrates one embodiment of a cloud computing system that can be implemented to provide, monitor, and analyze services from one or more contact centers. System 1100 includes client access devices 1102 accessed by client 1 through client n and agent devices 1104 operated by agent 1 through agent n at one or more contact centers 1105. Client access devices 1102 may be telecommunications devices (for example, mobile phones or land lines) or computing systems (for example, personal computers) connected to network 1106. Each of client access devices 1102 and agent devices 1104 may be connected to cloud computing system 1108 by way of network 1106. In certain embodiments, client access devices 1102 and agent devices 1104 may be connected to one another by way of network 1106.

Cloud computing system 1108 may provide remote computing resources, remote storage resources, or both, for systems connected to cloud computing systems 1108. For example, cloud computing system 1108 may provide cloud computing services to users of client access systems 1102.

Various system architectures may be employed in cloud computing system 1108. Systems and components of cloud computing system 1108 may be at a single physical location, such as a data center, or distributed among any number of locations. Cloud computing system 1108 includes cloud application services 1110, cloud platform 1112, cloud infrastructure 1114, cloud data storage 1116, and cloud security 1118. Cloud applications services may be implemented by way of one or more computer systems, each include one or more central processing units, such as described herein. Examples of application services 1110 include providing contact monitoring, agent efficiency analytics, alert generation, report generation. Cloud application services 1110 may access cloud data storage 1116.

In some embodiments decision support services are provided to users using application services in a computing cloud. In one embodiment, product search, business intelligence, or combinations thereof, are performed as one of application services 1110. In certain embodiments, services in a cloud receive a message feed from a local computing system, such as one or more of data source computing systems 1104, or from third party information providers.

Cloud infrastructure 1114 may encompass a variety of physical resources, such as computing devices, servers, block storage, mass storage devices, file servers, software, and network systems. In some embodiments, a cloud computing system encompasses virtualized resources, such as virtualized data storage or virtualized hardware.

In some embodiments, a service provider provides services to decision makers by way of cloud computing resources. In some embodiments, computation resources are rented or leased to customers of the service provider. In certain embodiments, services are provided to users at sites as software as a service ("SaaS") or platform as a service ("Paas"). Services may be provided to each user on an on-demand basis.

Networks 1106 and 1107 may include any suitable data network or combination of networks that enable the exchange of information between electronic systems. For example, networks 1106 may include one or more Local Area Networks (LANs) such as Ethernet networks, as well as Wide Area Networks (WANs), Metropolitan Area Networks (MANs), or other data or telecommunication networks implemented over any suitable medium, such as electrical or optical cable, or via any suitable wireless standard such as IEEE 802.11 ("Wi-Fi"), IEEE 802.16 ("WiMax"), etc. In various embodiments, all or a portion of networks 1106 may include the network infrastructure commonly referred to as the Internet. In other embodiments, networks 1106 and 1107 may be entirely contained within an enterprise and not directly accessible from the Internet. In certain embodiments, information may be exchanged over a virtual private network. In one embodiment, information is exchanged over the internet, but encrypted in such a way to make a private network not accessible from the rest of the internet.

Figure 8:
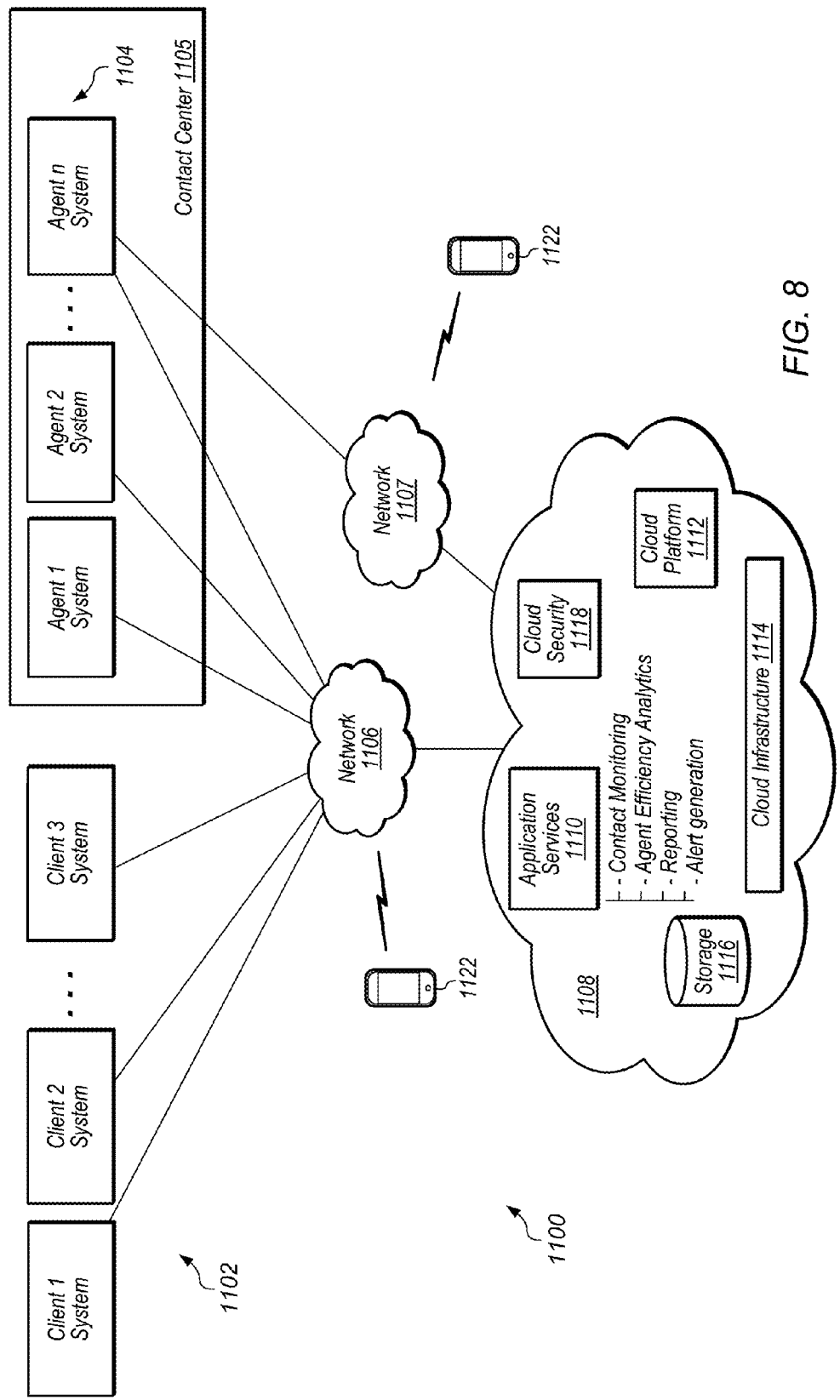
FIG. 8 illustrates one embodiment of a cloud computing system that can be implemented to provide, monitor, and analyze services from one or more contact centers.

In various embodiments, some users may be connected over a different network than other users. For example, as shown in FIG. 8, agents may be connected to cloud computing system 1108 over network 1107. In some embodiments, one or more users are connected over a private network. For example, in the embodiment shown in FIG. 7, network 1106 may be a public network and network 1107 may be a private network.

In various embodiments, a user may communicate over systems in system 1100 from locations external to decision makers and cloud computing system 1108. For example, a decision maker may communicate with users at a remote location by way of portable electronic devices 1122. Portable electronic devices 1122 may be located anywhere, including a home, a government office, or any other location.

Although for illustrative purposes only three clients and three contact center agents are shown in FIG. 8, a system may include any number of sites and any number of site computer systems.

Computer systems may, in various embodiments, include components such as a CPU with an associated memory medium such as Compact Disc Read-Only Memory (CD-ROM). The memory medium may store program instructions for computer programs. The program instructions may be executable by the CPU. Computer systems may further include a display device such as monitor, an alphanumeric input device such as keyboard, and a directional input device such as mouse. Computer systems may be operable to execute the computer programs to implement computer-implemented systems and methods. A computer system may allow access to users by way of any browser or operating system.

Computer systems may include a memory medium on which computer programs according to various embodiments may be stored. The term "memory medium" is intended to include an installation medium, e.g., Compact Disc Read Only Memories (CD-ROMs), a computer system memory such as Dynamic Random Access Memory (DRAM), Static Random Access Memory (SRAM), Extended Data Out Random Access Memory (EDO RAM), Double Data Rate Random Access Memory (DDR RAM), Rambus Random Access Memory (RAM), etc., or a non-volatile memory such as a magnetic media, e.g., a hard drive or optical storage. The memory medium may also include other types of memory or combinations thereof. In addition, the memory medium may be located in a first computer, which executes the programs or may be located in a second different computer, which connects to the first computer over a network. In the latter instance, the second computer may provide the program instructions to the first computer for execution. A computer system may take various forms such as a personal computer system, mainframe computer system, workstation, network appliance, Internet appliance, personal digital assistant ("PDA"), television system or other device. In general, the term "computer system" may refer to any device having a processor that executes instructions from a memory medium.

The memory medium may store a software program or programs operable to implement embodiments as described herein. The software program(s) may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes (MFC), browser-based applications (e.g., Java applets), traditional programs, or other technologies or methodologies, as desired. A CPU executing code and data from the memory medium may include a means for creating and executing the software program or programs according to the embodiments described herein.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Methods may be implemented manually, in software, in hardware, or a combination thereof. The order of any method may be changed, and various elements may be added, reordered, combined, omitted, modified, etc. Changes may be made in the elements described herein without departing from the spirit and scope of the invention as described in the following claims.

What is claimed is:

1. A method of managing processes for responding to requests, comprising:
    creating a process definition;
    performing, by a contact center management system implemented on one or more computer systems, using the process definition, an optimization of one or more resources employed for the process;
    developing one or more recommendations based on the optimization;
    determining, by the contact center management system, one or more forecasts for contact arrivals;
    monitoring, by the contact management system, two or more actual contact arrivals handled based on the recommendations;
    making one or more adjustments to the one or more forecasts for the contact arrivals; and
    determining, by the contact management system, one or more measures of effectiveness of adjusting forecasts made for the contact arrivals, wherein the one or more measures of effectiveness comprises a frequency of forecast adjustments.

2. The method of claim 1, wherein the resource comprises staff for fulfilling requests.

3. The method of claim 1, further comprising performing one or more simulations, wherein at least one of the recommendations is based at least in part on the simulation.

4. The method of claim 1, wherein the request comprises a claim for benefits.

5. The method of claim 1, wherein the request comprises an insurance application.

6. The method of claim 1, wherein the optimization is non-deterministic.

7. The method of claim 1, wherein the optimization is based in part on one or more uncertainty factors.

8. The method of claim 1, further comprising estimating, by the contact center management system, a staffing level based on the optimization.

9. The method of claim 1, wherein one or more the optimization/estimates are used or refreshed in a production environment.

10. The method of claim 1, further comprising the contact center management system making an initial feasibility determination of a process based on a set of factors.

11. The method of claim 10, further comprising, if the initial feasibility determination is negative, recommending or implement changes to overcome one or more deficiencies.

12. The method of claim 1, wherein further comprising displaying, via a dashboard, one or more recommendations for a process change.

13. The method of claim 1, further comprising:
    displaying, via a dashboard, one or more controls for implementing process changes, and receiving, via one or more of the controls, a selection or instruction to effect a process change.

14. The method of claim 1, wherein performing the optimization comprises integrating data from at least one of a workforce management system, an automatic call distribution system, and an interactive voice recorder.

15. A system, comprising:
    one or more computer systems configured to implement a contact center management system, wherein the contact center management system is configured to:
    create a process definition;
    perform, using the process definition, an optimization of one or more resources employed for the process;
    develop one or more recommendations based on the optimization;
    determine one or more forecasts for contact arrivals;
    monitor two or more actual contact arrivals handled based on the recommendations;
    make one or more adjustments to the one or more forecasts for the contact arrivals; and
    determine one or more measures of effectiveness of adjusting forecasts made for the contact arrivals, wherein the one or more measures of effectiveness comprises a frequency of forecast adjustments.

16. A method of managing processes for responding to contact arrivals, comprising:
- monitoring, by a contact center management system implemented on one or more computer systems, actual contact arrivals;
- comparing, by the contact center management system, actual contact arrivals with one or more arrival forecasts;
- monitoring, by the contact center management system, actual service performance during two or more of the contacts;
- comparing, by the contact center management system, actual service performance with one or more service performance forecasts; and
- determining at least one staffing level based at least in part on at least one of the comparisons between actual contact arrivals and arrival forecasts and at least one of the comparisons between actual service performance and service performance forecasts.

17. The method of claim 16, wherein comparing comprises displaying forecast arrivals and actual arrivals overtime together in a graph.

18. The method of claim 16, further comprising monitoring, by the contact center management system, compliance with one or more services levels for responding to contact arrivals, wherein at least one of the recommendations is based at least in part on a measured service level.

19. The method of claim 16, further comprising performing, by the contact center management system, one or more optimizations, wherein performing the optimization comprises integrating data from at least one of a workforce management system, an automatic call distribution system, and an interactive voice recorder.

20. A system, comprising:
- one or more computer systems configured to implement a contact center management system, wherein the contact center management system is configured to:
- monitor actual contact arrivals;
- compare actual contact arrivals with one or more arrival forecasts;
- monitor actual service performance during two or more of the contacts;
- compare actual service performance with one or more service performance forecasts; and
- determine at least one staffing level based at least in part on at least one of the comparisons between actual contact arrivals and arrival forecasts and at least one of the comparisons between actual service performance and service performance forecasts.

* * * * *